3,400,158
4-(1-HYDROXY-2,6,6-TRIMETHYL-2-CYCLOHEXEN-1-YL)-3-BUTENE-2-ONE
Donald L. Roberts, Winston-Salem, N.C., assignor to R. J. Reynolds Tobacco Company, Winston-Salem, N.C., a corporation of New Jersey
No Drawing. Filed Nov. 2, 1966, Ser. No. 591,429
1 Claim. (Cl. 260—587)

ABSTRACT OF THE DISCLOSURE

The novel compound, 4-(1-hydroxy-2,6,6-trimethyl-2-cyclohexen - 1 - yl) - 3 - butene-2-one, is prepared from β-ionone by epoxidation and hydrolysis. Said compound has utility as an intermediate in the production 1-hydroxy-4-keto-α-ionone which in turn may be used to produce the plant abscission accelerating hormone abscisin II.

---

The present invention relates to a new composition of matter.

The new composition of matter of the present invention is designated chemically as 4-(1-hydroxy-2,6,6-trimethyl-2-cyclohexene-1-yl)-3-butene-2-one and has the following structural formula:

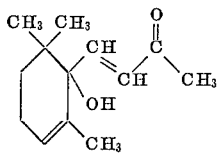

Compound I

For simplicity Compound I can be designated 1-hydroxy-α-ionone. This material can be prepared as follows:

β-Ionone (192 g., 1 mole) was added rapidly to 230 grams of m-chloroperbenzoic acid (1 mole, 80% peracid) in 2000 milliliters of chloroform. The reaction was cooled with an ice bath and after one-half hour a copious white precipitate was formed. The reaction mixture stood overnight, then was filtered, and the filtrate was washed with sodium carbonate solution. The chloroform was removed in vacuo and the residue was predominantly β-ionone monoepoxide according to infrared analysis.

β-Ionone monoepoxide (24 g.) was dissolved in 125 milliliters of alcoholic sulfuric acid solution (prepared from 30 milliliters of 20% aqueous sulfuric acid and 95 milliliters of ethanol) and allowed to stand 24 hours. The reaction mixture was diluted with water and extracted with ether. The residue remaining after removal of the ether was chromatographed on silicic acid. The following products were obtained: 2.8 grams of unreacted epoxide, 3.9 grams of an unknown compound, 1.2 grams of 1-hydroxy-α-ionone, melting point 82–83°, and 6.3 grams of 1,2-dihydroxy-1,2-dihydro-β-ionone, melting point 111°.

The 1-hydroxy-α-ionone was identified from its infrared and nuclear magnetic resonance spectra. Infrared spectrum: 3480, 1682, 1654, 1632, 1255, 1120, 995, 980, 900 and 800 cm.$^{-1}$. Nuclear magnetic resonance spectrum: τ=3.46 and 3.70 (2, trans double bond), 4.57 (1, CH=C), 7.83 (3, CH$_3$CO), 8.43 (3, CH$_3$C=C), and 9.1 (6, (CH$_3$)$_2$C).

Analysis.—Calcd. for C$_{13}$H$_{20}$O$_2$: C, 74.96; H, 9.68. Found: C, 75.04; H, 9.55.

The new compound, 1-hydroxy-α-ionone, finds particular utility in the preparation of the plant abscission hormone, abscisin II, which chemically is 3-methyl-5-(1-hydroxy-4-oxo-2,6,6-trimethyl-2-cyclohexene-1-yl)-cis,trans-2-4-pentadienoic acid having the following structure:

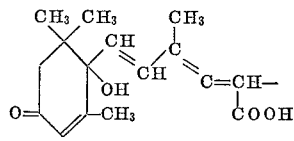

The trans,trans-isomer of abscisin II has the structure:

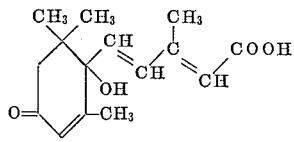

The above plant hormone, abscisin II, is an abscission-accelerating substance which can be isolated from young cotton fruits and sycamore leaves. The synthetic production of this hormone is obviously desirable and this can readily be accomplished utilizing as a starting material Compound I of the invention. In carrying out this synthesis, Compound I can be oxidized using oxidizing agents such as chromium trioxide, t-butyl chromate, chromium trioxide-pyridine complex and the like to 1-hydroxy-4-keto-α-ionone, which latter compound is disclosed and claimed in the copending application of Ralph L. Rowland and Donald L. Roberts, Ser. No. 533,839, filed Mar. 14, 1966. The 1-hydroxy-4-keto-α-ionone can in turn be employed to produce abscisin II. This synthesis is illustrated in the following paragraphs.

Oxidation of 1-hydroxy-α-ionone

The compound 1-hydroxy-α-ionone (1.0 g.) was dissolved in 10 milliliters of acetic acid and a solution of chromium trioxide (1.5 g.) in 10 milliliters of acetic acid was added dropwise with stirring. The reaction was stirred for 30 minutes at 25° then concentrated in vacuo. The residue was diluted with water and extracted with ether. The ether was extracted with sodium carbonate solution, dried, and concentrated to yield 1 gram of crude products containing, by gas chromatographic analysis, 27% 1-hydroxy-4-keto-α-ionone and 47% starting material.

Synthesis of abscisin II via 1-hydroxy-4-keto-α-ionone

Carbethoxymethylenetriphenylphosphorane (21.75 g., 0.063 mole) was dissolved in 150 milliliters of toluene and 25 milliliters of toluene was distilled to dry the reagents. The compound 1-hydroxy-4-keto-α-ionone (11.15 g., 0.05 mole) was added and the solution was refluxed under an atmosphere of nitrogen for 30 hours during which time additional carbethoxymethylenetriphenylphosphorane (10 g.) was added to the reaction. The solution was cooled and the triphenylphosphine oxide which precipitated was removed by filtration. The filtrate was shown by gas chromatography to contain 50% of ethyl 3-methyl-5 - (1 - hydroxy-4-keto - 2,6,6-trimethyl-2-cyclohexene-1-yl)-cis,trans-2,4-pentadienoate, 40% of the corresponding trans,trans-pentadienoate, and 10% of 1-hydroxy-4-keto-α-ionone.

The residue remaining after concentration was hydrolyzed in 10% potassium hydroxide in 70% aqueous methanol at room temperature for 24 hours. The methanol was removed in vacuo, water was added, and the solution was extracted with chloroform. The aqueous layer was acidified with 50% sulfuric acid, extracted with ether, and dried over sodium sulfate. Ten grams of semicrystalline material was obtained on evaporation of the ether. The sample was redissolved in ether; the volume was then reduced to approximately one half. The crystalline material which formed at this concentration was shown to be abscisin II by its infrared spectrum and melting point. An 18% yield was obtained. Further concentration of the filtrate produced a 15% yield of the corresponding trans,trans-pentadienoic acid. The overall yield of crystalline abscisin II isomers based on 1-hydroxy-4-keto-α-ionone was 54%.

*Analysis.*—Abscisin II calcd. for $C_{15}H_{20}O_4$: C, 68.16; H, 7.63. Found: C, 68.07; H, 7.64. Trans,trans-isomer of abscisin II cld. for $C_{15}H_{20}O_4$: C, 68.16; H, 7.63. Found: C, 68.06; H, 7.62.

Those modifications and equiavlents which fall within the spirit of the invention and the scope of the appended claim are to be considered part of the invention.

I claim:
1. 4 - (hydroxy-2,6,6-trimethyl-2-cyclohexen - 1 - yl)-3-butene-2-one.

References Cited
UNITED STATES PATENTS 2,845,440  7/1958  Isler et al. _____ 260—586

FOREIGN PATENTS 1,343,943  10/1963  France.

LEON ZITVER, *Primary Examiner.*

M. JACOB, *Assistant Examiner.*